(12) United States Patent
Le et al.

(10) Patent No.: US 12,093,516 B2
(45) Date of Patent: Sep. 17, 2024

(54) INTERACTION METHOD USING EYE TRACKING DATA

(71) Applicants: Ha Thanh Le, Ha Noi (VN); Duyen Thi Ngo, Ha Noi (VN); Bong Thanh Nguyen, Ha Noi (VN)

(72) Inventors: Ha Thanh Le, Ha Noi (VN); Duyen Thi Ngo, Ha Noi (VN); Bong Thanh Nguyen, Ha Noi (VN)

(73) Assignee: Ha Thanh Le, Ha Noi (VN)

( * ) Notice: Subject to any disclaimer, the term of this patent is extended or adjusted under 35 U.S.C. 154(b) by 0 days.

(21) Appl. No.: 18/241,188

(22) Filed: Aug. 31, 2023

(65) Prior Publication Data
US 2023/0409177 A1 Dec. 21, 2023

(51) Int. Cl.
*G06F 3/04842* (2022.01)
*G06F 3/01* (2006.01)
*G06F 3/03* (2006.01)
*G06F 3/04845* (2022.01)
*G06F 3/0485* (2022.01)

(52) U.S. Cl.
CPC .......... *G06F 3/04842* (2013.01); *G06F 3/013* (2013.01); *G06F 3/015* (2013.01); *G06F 3/03* (2013.01); *G06F 3/04845* (2013.01); *G06F 3/0485* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 2009/0125849 | A1* | 5/2009 | Bouvin | G06F 3/013 715/863 |
| 2017/0212583 | A1* | 7/2017 | Krasadakis | G06F 3/0482 |

* cited by examiner

*Primary Examiner* — Nicholas J Lee (57) ABSTRACT

The present invention relates to an interaction method using eye tracking data, used in human-computer interface system with at least a screen configured to display at least user contents and eye tracking device to collect eye tracking data. The method comprising following steps: displaying selection keys on the screen, when there is a selecting interaction control signal of the user reflecting that the user intends to automatically change user contents being displayed on the screen; defining a selection key which the user wants to input based on at least the eye tracking data when the user inputs the selection key by eye gaze; automatically changing the user contents in a predefined changing manner corresponding to the selection key inputted by the eye gaze of the user, wherein said predefined changing manner selected from a group including at least scroll down, scroll up, scroll right, scroll left, zoom in, zoom out, turn the pages, move the pages, and insert new contents.

13 Claims, 6 Drawing Sheets

| Symbols | Meaning |
|---|---|
| ⊝ | Idle interactive mode |
| ◈ | Control interactive mode |
| ✱ | Selection interactive mode |
| ... | Optional control state |
| ↑ | 1v speed moving up control state |
| ↓ | 1v speed moving down control state |
| ← | 1v speed moving left control state |
| → | 1v speed moving right control state |
| + | Zooming out control state |
| - | Zooming in control state |
| d | Default control state |

FIG.6a

| Keys | Current states | Next states |
|---|---|---|
| Up | ({↑, ↑↑, ↑↑↑}, ◈) | ({↑}, ◈) |
| Up | ({↑}, ◈) | ({↑↑}, ◈) |
| Up | ({↑↑}, ◈) | ({↑↑↑}, ◈) |
| Up | ({↑↑↑}, ◈) | ({↑}, ◈) |
| Down | ({↓, ↓↓, ↓↓↓}, ◈) | ({↓}, ◈) |
| Down | ({↓}, ◈) | ({↓↓}, ◈) |
| Down | ({↓↓}, ◈) | ({↓↓↓}, ◈) |
| Down | ({↓↓↓}, ◈) | ({↓}, ◈) |
| Left | ({←, ←←, ←←←}, ◈) | ({←}, ◈) |
| Left | ({←}, ◈) | ({←←}, ◈) |
| Left | ({←←}, ◈) | ({←←←}, ◈) |
| Left | ({←←←}, ◈) | ({←}, ◈) |
| Right | ({→, →→, →→→}, ◈) | ({→}, ◈) |
| Right | ({→}, ◈) | ({→→}, ◈) |
| Right | ({→→}, ◈) | ({→→→}, ◈) |
| Right | ({→→→}, ◈) | ({→}, ◈) |
| Zoom out | ({...}, ◈) | ({+}, ◈) |
| Zoom in | ({...}, ◈) | ({-}, ◈) |
| interactive mode | ({...}, ◈) | ({d}, ⊝) |
| interactive mode | ({...}, ⊝) | ({d}, ✱) |
| interactive mode | ({...}, ✱) | ({d}, ◈) |

FIG.6b

INTERACTION METHOD USING EYE TRACKING DATA

TECHNICAL FIELD

The present invention relates to an interaction method using eye tracking data, used in human-computer interface system with at least a screen configured to display at least user contents and an eye tracking device to collect eye tracking data. The present invention also relates to a system and a non-transitory computer readable storage medium stores a computer readable program for implementing the said method.

BACKGROUND

Currently, in Vietnam and as well as in the world, people with impaired motor function or people who work in special conditions that common input devices such as keyboards or mouse devices cannot be applied. For the purpose of supporting these subjects, human-computer interaction systems using eye tracking data (Eye tracking—ET) has been developed, applied, and achieving a lot of improvements in practical. Different from the traditional computer interface controlled by physical mouse devices, and keyboards, human-computer interaction systems using ET data using signals from the body of the user such as the eye gaze direction to control the cursor/pointer to move on the screen which is able to display user interface supporting the user to interact with the computer. The ET data is collected and convert to cursor coordinates on the screen, when the eye gaze direction of the user changed through different positions on the screen will move the cursor over the respective positions on the screen, that is, at a certain extent, having the same role as moving the cursor by physical mouse devices or keyboards.

As an alternative manner to clicking or pressing a key by the physical mouse device or keyboard, several known traditional methods using a time parameter corresponding to required time duration that the user has to look at a key on a virtual keyboard or a control interface to select ("click" or "press") that key, the time parameter is so called "dwell" parameter. The dwell parameter allows the design of a processing and calculating system to define keys relatively simple and easy. However, how long is the length of the time duration of dwell is still a problem to deal with. If the value is great, users will have to keep their eyes fixed in a certain position for too long causing eye fatigue, whereas if the value is too small, users won't have sufficient time to find the desired keys or buttons causing controlling or data inputting errors.

In general, even if the dwell time is optimized, the interaction between human and computer using ET data always takes a certain amount of time to be able to select or input a key, which is relatively much longer than selecting or inputting by a physical mouse device or keyboard, or a same method such as touch method. This leads to many applications designed for users who use mouse devices, keyboards, or touch devices may be not entirely appropriate or causing inconvenience for interacting between human and computer using ET data.

Therefore, there is a need to develop an interaction method using ET data may improve interaction speed and more convenient for users.

SUMMARY

An object of the present invention is to provide an interaction method using eye tracking data, may overcome one or more above mentioned problems.

Another object of the present invention is to provide an interaction method using eye tracking data may improve interaction speed and more convenient for users.

Yet another object of the present invention is to provide a system and a non-transitory computer readable storage medium stores a computer readable program for implementing the said method.

Various objects to be achieved by the present invention are not limited to the aforementioned objects, and those skilled in the art to which the disclosure pertains may clearly understand other objects from the following descriptions.

To achieve one or more above objects, according to an aspect, the present invention provides an interaction method using eye tracking data, used in human-computer interface system with at least a screen configured to display at least user contents and an eye tracking device to collect eye tracking (ET) data, the method comprising following steps:
displaying selection keys on the screen, when there is a selecting interaction control signal of the user reflecting that the user intends to automatically change the user contents being displayed on the screen;
collecting and processing an ET dataset while the user is looking at the screen to determine the eye tracking data which is the data of coordinate form (x, y) corresponding to the position on the screen that the user's eyes look at;
defining a selection key which the user wants to input based on at least the eye tracking data when the user inputs the selection key by eye gaze;
automatically changing the user contents in a predefined changing manner corresponding to the selection key inputted by the eye gaze of the user,
wherein said predefined changing manner selected from a group including at least scroll down, scroll up, scroll right, scroll left, zoom in, zoom out, turn the pages, move the pages, and insert new contents.

Preferably, the user contents, which are automatically changed in a predefined changing manner, is user contents within at least a displaying area on the screen,
wherein said displaying area on the screen is defined based on at least the eye tracking data when the user selects said displaying area on the screen by looking at the displaying area on the screen after the user has completed said selection key inputting.

According to an embodiment, the selecting interaction control signal of the user generated when the user inputs an selection interactive key by the eye gaze of the user, and switch to an selection interactive mode, in the selection interactive mode the selection keys are displayed on the screen while the screen keeps showing the previous contents or information,
wherein the screen further displays at least one control interactive key in the selection interactive mode together with the selection keys,
wherein, if the control interactive key is inputted then said automatically changing the user contents in said predefined changing manner is stopped, and switched to an idle interactive mode.

According to an embodiment, the screen further displays at least one idle interactive key in the idle interactive mode,
wherein, if the control interactive key is inputted then the user is allowed to select execution keys displayed on the screen or already displayed on the screen to execute a task corresponding to the execution key inputted.

According to an embodiment, said displaying area on the screen is a displaying frame on the screen having both a vertical scrollbar and a horizontal scrollbar, wherein the displaying frame on the screen has at least one execution key at the end of the vertical or horizontal scrolling movement path.

Preferably, the method further comprising analyzing at least eye movements of the user to determine whether to continue automatically changing the user contents in a predefined changing manner or not.

Said eye movement analyzing of the user comprising at least analyzing the correlation between the speed and the eye movement direction with the change of user contents.

Preferably, said automatically changing the user contents has a changing speed selected among of predefined changing speeds arranged in levels from slow to fast.

Preferably, the level of the changing speed will be determined based on at least the number of consecutive times that a selection key is inputted, a previous level of the changing speed, and a previous changing mode.

Preferably, the method further comprising analyzing at least eye movements of the user to adjust the current changing speed of said automatically changing the user contents.

Said defining a selection key which the user wants to input based on eye tracking data comprising:

defining a selection key which the user wants to input based on the (x, y) coordinates on the screen that the user's eyes be looking at by calculating whether said (x, y) coordinates is within the boundary of a certain key or not, if the (x, y) coordinates is within the boundary of the key then setting up and calculating a time counting parameter t to confirm whether the user is trying to select said key or not, based on at least a time constraint defined as t≥dwell, wherein dwell is a known parameter corresponding to a required time duration that the user has to look at a key to select that key, and when the time constraint is satisfied then confirming that the user wants to select that key.

According to an embodiment, the time counting parameter t is defined by an actual time that the user keeps looking at said selection key.

According to an embodiment, the time counting parameter t is defined according to the formula $t:=t+\Delta+\Delta_T$ in each cycle and repeated in the next cycle, wherein:

$\Delta>0$ is an increasing rate of the time counting parameter; and $\Delta_T$ is an adjusting rate is defined based on Electroencephalography (EEG) data, wherein $\Delta_T>0$ reflecting concentration status of the user and $\Delta_T<0$ reflecting non-concentration status of the user, while the user is looking at the selection key.

The eye tracking device is a fixed device embedded in the screen, a device connected or attached on the screen of an electronic apparatus, or a device which is wearable by the user preferred as a glasses.

According to another aspect, the present invention provides a non-transitory computer readable storage medium storing a computer readable program comprising instructions that, when executed will cause the computer implementing above mentioned method.

DESCRIPTION OF EMBODIMENTS

The invention will be more fully described by reference to the accompanying drawings. The exemplarily embodiments are provided for the present invention is to be clear and fully describe the scope of the present invention for those skilled in the art. Specific elements are provided, such as specific portions, devices and methods, to support clear understanding of the embodiments according to the present invention. For those skilled in the art it will be clear that there is no need to use specific elements, but exemplarily embodiments may be expressed in many different forms and the specific elements and methods shall not be construed to limit the scope of the disclosure of the invention.

Firstly, as for the convenience of understanding the invention, different basic concepts according to the invention will be described with reference to the accompanying drawings.

Figure 1:
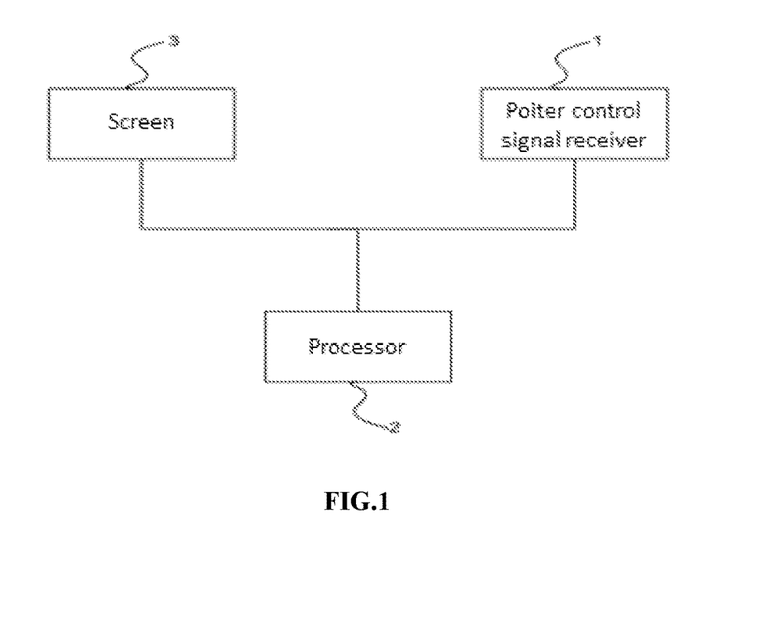
FIG. 1 is a schematic diagram illustrating a human-computer interface system which is simplified.

FIG. 1 is a schematic diagram illustrating a human-computer interface system which is simplified, wherein the user uses eye gaze to interact with the application being turned on and displayed on the screen, to perform specific tasks.

Similar to the conventional human-computer interface systems, the system is shown in FIG. 1 including a screen 3 to display an application which has been turning on including at least keys and contents, a pointer control signal receiver 1, a processor 2 helping the user to control the pointer to interact with at least the keys and contents displayed on the screen.

The present invention is only different that it uses eye tracking data, for example track and collect information about the eye direction of the user's eyes to the screen to convert into the pointer position on the screen, by this manner when the user using eye movement to change the eye direction to different positions on the screen will move the pointer to the corresponding positions on the screen.

Figure 2:
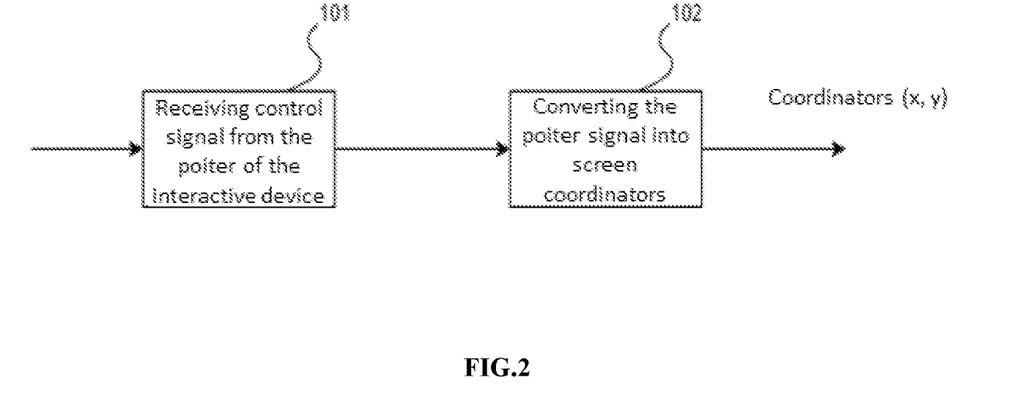
FIG. 2 is a schematic diagram illustrating the operation of the pointer control signal receiver according to a preferred embodiment of the present invention.

FIG. 2 is a schematic diagram illustrating the operation of the pointer control signal receiver according to a preferred embodiment of the present invention.

As shown in FIG. 2, the pointer control signal receiver according to the preferred embodiment may receive the eye tracking data which is the data of coordinate form (x, y) corresponding to the position on the screen that the user's eyes look at through the steps 101, and 102 to get a pointer control signal from an interactive device which is the mentioned eye tracking data, and convert the pointer control signal to a screen signal which is the mentioned (x, y) coordinates.

The eye tracking data may be collected through an eye tracking data collecting device.

According to a preferred embodiment of the present invention, the ET data collecting device may be used to determine the position where the user's eyes are seeking, or in another sense, the ET data collecting device may use the movement trajectory of the user's eyes as pointer control properties, defining important information in behavior and intention of the user. The defining a key that the user wants to select through coordinates eye movement ET data by considering the coordinates (x, y) of the user's eye position looking at the screen, and comparing with, for example coordinates of the boundary of the key, if said coordinates is within the boundary of the key the system will confirm that the user wants to select that key.

To "input" or "type" a key by eyes, the user may stand/sit/lie down in front of the screen, with a predetermined distance, for example at least 60 cm and maximum 1 m. The screen displaying user interface and keys. The user using eye gaze to select keys or input text contents. To select a key or a character/word on the screen, the user seeks that key or character/word by eye. The screen displays an inputting pointer in form of a small ring at location where the user is looking on the screen. When seeking the key or character/word which the user wants to choose, the user looks in a concentrated way on the target to fix the inputting pointer position at the target.

Preferably, the user interface is displayed suitable to the pose of the user, for example when the user is in lying, sitting, or standing position, the user interface may be selected with different displays for the most convenience for users to observe and input data by eyes. The determining user poses may be carried out by collecting images and analyzing poses of the user. The eye tracking device may be fixed (embedded in the screen), movable (connected or attached on various screens of electronic apparatuses) or wearable (embedded in a glasses), or the eye tracking device may include an infrared camera. However, the present invention is not limited thereto.

Figure 3:
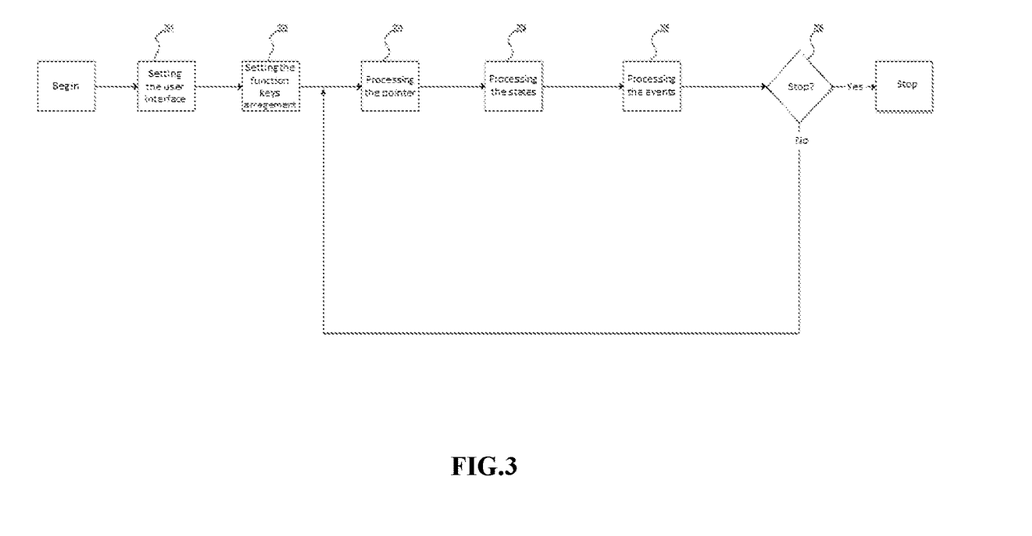
FIG. 3 is a schematic diagram illustrating a part operation of the processor according to a preferred embodiment of the present invention.

FIG. 3 is a schematic diagram illustrating a part of the operation of the processor according to a preferred embodiment of the present invention.

The flowchart is illustrated by steps from step 201 to step 206.

Starting from the step 201 displaying the user interface by opening an application, for example opening a web page, which the user selects among the list of default applications. The user interface may be pre-set by an original application developer.

Step 202 displaying function keys at specific locations depending on the current mode of the application. Herein, function keys may include function keys which already made by the original application developer and function keys which added for the purpose of making it easier for users to interact with their eyes.

As for a convenience for the user, the displaying the function keys may be performed in the default mode of the application and are displayed on the screen while the screen keeps showing the previous contents or information. Hence, the user substantially remains to see/view/watch, follow, or interact on the contents or the interface of the application made by the original application developer, but there is more function keys to be added or change the way to interact more convenient.

Step 203 processing tasks related to the pointer using pointer coordinates and function keys which are selected or "inputted" by the pointer. Once receiving above mentioned coordinates (x, y) corresponding to the position on the screen that the user's eye looks at, the pointer will be updated according to said coordinates, and defined whether at the current position, the pointer is within a boundary of a function key or not? If yes then implementing procedures to determine whether or not the user wants to select or "input" that function key at said current position of the pointer? If yes then sending a signal that the function key be selected or "inputted" to the processor for processing at the next step.

Step 204: processing statuses for changing the status of the application or initiating a new events depending on the function key which is selected or "inputted" by the pointer and the current status of the application. For example, if the function key is selected or "inputted" by the pointer is a selection interactive key, then the application will be switched to an selection interactive mode and displaying selection keys on the screen while the screen keeps showing the previous contents or information, for the user continues to select or "input" among the selection keys which are displayed, for example selection keys may be scroll down key, scroll up key, scroll right key, scroll left key, zoom in key, and zoom out key, but not limited thereto.

Step 205: processing an event if receiving an unprocessed event.

Step 206: checking whether the user wants to finish the application or not, if yes then finishing the application. In vice versa, it means that the user wants to continue, the application may be turned back to the step 203.

According to the present invention, determining whether the user wants to select a key at the position of the pointer or not may be based on the pointer coordinates on the screen within the boundary of said expected selection key or not, and the time duration that the user keeps looking at the position of that expected selection key.

The term "key" needs to be understood as the broadest meaning as possible and encompass keys, selection keys, function keys, control keys, interactive keys, press keys, buttons, press buttons, characters, tags, icons, but not limited thereto.

According to a specific exemplarily embodiment, to determining whether the pointer coordinates on the screen is within the boundary of said expected selection key or not, change or deviation on the position of the pointer during the processing time is calculated, to determine whether the deviation of the pointer position is within the allowable range or not. Firstly, the pointer position in coordinates (x, y) are updated according to the eye tracking data of the user in the real time and saved to a queue to form a dataset of multiple coordinates (x, y) indicating the pointer positions at consecutively updated times, after that a distance d from the latest updated coordinates (at the beginning of the queue) to the previous updated coordinates (for example coordinates updated right before that time or coordinates updated at the beginning being in the queue (at the end of the queue)), to determine whether the pointer position which is moved according to the user's eye gaze is deviated out of the considered key or not.

The distance d is calculated according to the formula:

$$d = \sqrt{(x_1-x_2)^2 + (y_1-y_2)^2}$$

wherein $(x_1, y_1)$, $(x_2, y_2)$ are pointer coordinates at the beginning and the end of the queue, respectively.

In general, the number of the number of elements in the queue depends on the time interval between two consecutive sampling times of the pointer coordinates as well as the sampling frequency of the pointer control signal receiver. In a case that, the queue containing pointer coordinates is overload then it may delete the oldest coordinates to update the latest one.

It is obviously that, the queue is fully refreshed before updating coordinates when the pointer is determined to be on a certain key, if counting from that time the distance d is still within the allowable range md, that is d<md then the pointer is determined that there is a relatively small movement, and therefore it is considered not to deviate from that key. The distance md may be in a range 0 to 10 pixels, but not limited thereto.

When the pointer is determined not deviating out of said key and maintaining during a certain time duration or satisfying a certain time condition then it is possible to determine that the user wants to select the key at the pointer position, a key selection event together with the pointer coordinates (x, y) may be sent to the processor. In vice versa, it means that the user is uncertain in the selection of the key.

According to an preferred embodiment, a time constraint in which the pointer is maintained not deviating out of a certain key may be implemented by setting and calculating a time counting parameter t to confirm whether the user is expecting to select that key or not, based on at least the time constraint which is defined as t≥dwell, wherein dwell is a known parameter corresponding to a required time duration that the user has to look at a key to select that key, and when the time constraint is satisfied then confirming that the user wants to select that key.

In general, as for the data inputting or controlling by eye gaze in the human-computer interface system, the process by which users use their eyes to select a certain input key or control key may be divided into two main phases: a searching phase and a pending input phase. To select a key on the screen, users need to move a pointer on that key and keeping the pointer inside the key until the time duration that the user continuously looks at the key greater than or equal to the value of dwell. Herein, dwell is referred as pending input time and at this time the input or control key is defined as within the pending input time. If the pointer moves out of the key (or the user direct eye gaze out of the key area) prior to the timeout of the pending input time duration then said key won't be selected.

For example, when the user wants to select the key B, the user must direct eye gaze to look at that key so that the pointer on the screen moving inside the key B, and keep the eye gaze continuously looks at the key B to keep the pointer inside the key B and not to move out of the key B, until the time duration in which the pointer is inside the key B reached to the value of dwell then the system confirms that the user wants to select the key B. In general, if the time duration in which the pointer inside the key B not to reach the value of dwell but the user directs the eye gaze to a different place then the inputting is fail and the process backs to the beginning if the user still want to continue to select the key B. Obviously, for each different user the value of dwell may be adjusted to be suitable to each specific user.

In general, using the pending time duration dwell may be combined with different methods to optimize data inputting or control by eye gaze in the human-computer interface system, for example combining with the assessment of the status of concentration or not concentration of the user, or poses of eye movements (such as blinks continuously a certain number of times), for example.

According to a preferred embodiment, using the pending time duration dwell may be combined with the assessment of the status of concentration or not concentration of the user. It is obviously that, the level of concentration of the user while the user looks at a key to select, for example the key B, is related to the accuracy of "intent" selecting the key B of the user. When the user looks to select the key B with a high level of concentration, the system may no need to wait for a time duration equal to the value of dwell to confirm that the user wants to select the key B. In vice versa, when the user looks at the key B with a low level of concentration or de concentration, the system may need to wait for a time duration greater than the value of dwell to confirm that the user wants to select the key B. The level of concentration of the user may be determined by analyzing the EEG data.

Therefore, the present invention aims to adjust the value of dwell is set up or prior known corresponding to a required time duration that the user has to look at a key to select that key by using a combination of two types of data ET and EEG.

The human-computer interface system according to the present invention (hereafter may be referred as the system) comprising a computing device, a displaying screen, an ET data capturing device, an EEG data monitoring device. The EEG data monitoring device may be a wearable headset or a cap which includes plurality of sensors in form of contact electrodes on the user's head. The ET data capturing device may be fixed (embedded in the screen), movable (connected or attached on various screens of electronic apparatuses) or wearable (embedded in a glasses). According to another embodiment, the ET data capturing device may include an infrared camera.

According to different embodiments of the present invention, the EEG data monitoring device may be with a few channels or plurality of channels.

According to an embodiment, the ET data capturing device may be used to determine the position where user's eyes wants to seek, or in another sense, the ET data capturing device may use the movement trajectory of the human eye as features for controlling the pointer, detecting important information in behavior and intention of the user. The defining the key that the user wants to select based on ET eye movement data coordinates by considering the (x, y) coordinates location that the user's eye is looking on the screen, comparing with the coordinates of the boundary of the key, if said (x, y) coordinates is within the boundary of the key the system will confirm that the user wants to select that key.

The user stand/sit/lie down in front of the screen of the system, with a predetermined distance, for example at least 60 cm and maximum 1 m. The screen displaying user interface and keys. The user using eye gaze to select keys or input text contents. To select a key or a character/word on the screen, the user seeks that key or character/word by eye. The screen displays an inputting pointer in form of a small ring at location where the user is looking on the screen. When seeking the key or character/word which the user wants to choose, the user looks in a concentrated way on the target to fix the inputting pointer position at the target.

According to one or several embodiments of the present invention, the screen displays the user interface may not work continuously to save energy. The activating the screen to display the user interface may be carried out via recognizing or determining each time the user wants to select keys or input text contents to convey a content, intent, or a certain control command via directing eye gaze to a corresponding key.

For example, when the user is in a non-wearing state of the electroencephalography monitoring device and switch to a wearing state of the electroencephalography monitoring device the human-computer interface system according to the present invention will activate the screen to display the user interface to be ready for the user to select keys or input text contents.

Other alternative examples using any event, data or information which indicating that the user is expecting to select keys or input text contents on the screen which displays the user interface, may be used to activate the screen to display the user interface, for example capturing image and analyzing poses/postures of the user, may also be used.

Preferably, the user interface is displayed suitable to the pose/posture of the user, for example when the user is in a lying, sitting, or standing pose, the user interface may be selected among different interfaces to facilitate the user observing and inputting data by eye gaze. Determining the user's posture may be carried out by capturing images and analyzing postures of the user. However, the present invention is not limited thereto.

According to different embodiments of the present invention, the level of concentration while the user is looking at a key to select that key may be reflected by a time parameter, referred as an adjusting rate $\Delta\_T$, how it works will be described in more detail hereafter.

While the inputting pointer is within the boundary of the key (a button, a key, a control key, a word/character, tag, icon) the system will initialize a time counting parameter t=0 and update t after each loop with an increasing rate of the time counting parameter $\Delta$ (or increasing rate $\Delta$ in short) and an adjusting rate $\Delta\_T$. This process is called the input pending state. Whenever the value of t is greater or equal to dwell, the system determines that the user expect to select the key or the word/character at the position of the inputting pointer. If the user moves his or her eyes to another location outside of the pending key/word/character is to select, the time counting parameter t will be set to zero. The system cancels the input pending state of the key when the value of the time counting parameter is zero.

In general, the increasing rate $\Delta$ has a positive value reflecting the actual time duration in which the inputting pointer is within the boundary of the key, and the adjusting rate $\Delta_T$ reflecting the adjusting time duration which is based on the level of concentration of the user. For example, if the user is not in concentration then $\Delta_T$ may be negative, the time counting parameter t will be increased slower than the actual time, this means it takes longer than usual to determine that the user expect to select the key at the position of the inputting pointer. In contrary, if the user is in concentration then $\Delta_T$ may be positive, the time counting parameter t will be increased faster than the actual time, this means it takes shorter than usual to determine that the user expect to select the key at the position of the inputting pointer.

According to an embodiment, updating t after each loop is executed according to the formula $t:=t+\Delta+\Delta_T$.

It is easy to see from the above formula that, if it is without the presence of the adjusting rate $\Delta_T$, or by a specific reason the adjusting rate $\Delta_T=0$ (for example, the user not wearing the electroencephalography monitoring device), then after completing all loops, the value of the time counting parameter t is exactly equal to the actual time duration by which the inputting pointer is within the boundary of the key, this means that if t=dwell then the actual time duration in which the inputting pointer is within the boundary of the key is also equal to dwell. When the adjusting rate $\Delta_T$ is present and calculated based on the EEG data to reflect the level of the concentration of the user, then the value of the time counting parameter t is substantially different (greater or less than) the actual time duration in which the inputting pointer is within the boundary of the key, this means that if t=dwell then the actual time duration in which the inputting pointer is within the boundary of the key less than dwell (for example, when the user is in concentration, $\Delta_T>0$) or greater than dwell (for example, when the user is not in concentration, $\Delta_T<0$), ensuring more accurate confirmation of the key that the user expect to input according to the concentration state of the user while the user is looking at that key.

In an actual use, users do not always need to wear the electroencephalography monitoring device to carried out the key inputting according to the present invention. In particular, when the user is not wearing the electroencephalography monitoring device, the adjusting rate $\Delta\_T$ is determined as equal to zero, and the user can still input keys, because that after several loops the increasing rate $\Delta$ having a positive value still guarantee the value of t greater than or equal to dwell.

This is especially beneficial, for example in case of the user needs a support to wear the electroencephalography monitoring device, but there is not always a support person nearby, said user may input a command by eye gaze, for example asking for a support or call for an attendant/supporter, without wearing the electroencephalography monitoring device. When there is someone to help, said user may be support to wear the electroencephalography monitoring device to input the keys or text contents.

Next, an interaction method using eye tracking data which may improve the interaction speed and more convenient for users will be described.

In general, the interaction method using eye tracking data according to the present invention comprising the steps of:
  displaying selection keys on the screen, when there is a selecting interaction control signal of the user reflecting that the user intends to automatically change the user contents being displayed on the screen;
  collecting and processing an ET dataset while the user is looking at the screen to determine the eye tracking data which is the data of coordinate form (x, y) corresponding to the position on the screen that the user's eyes look at;
  defining a selection key which the user wants to input based on at least the eye tracking data when the user inputs the selection key by eye gaze;
  automatically changing the user contents in a predefined changing manner corresponding to the selection key inputted by the eye gaze of the user,
  wherein said predefined changing manner selected from a group including at least scroll down, scroll up, scroll right, scroll left, zoom in, zoom out, turn the pages, move the pages, and insert new contents.

Figure 4:
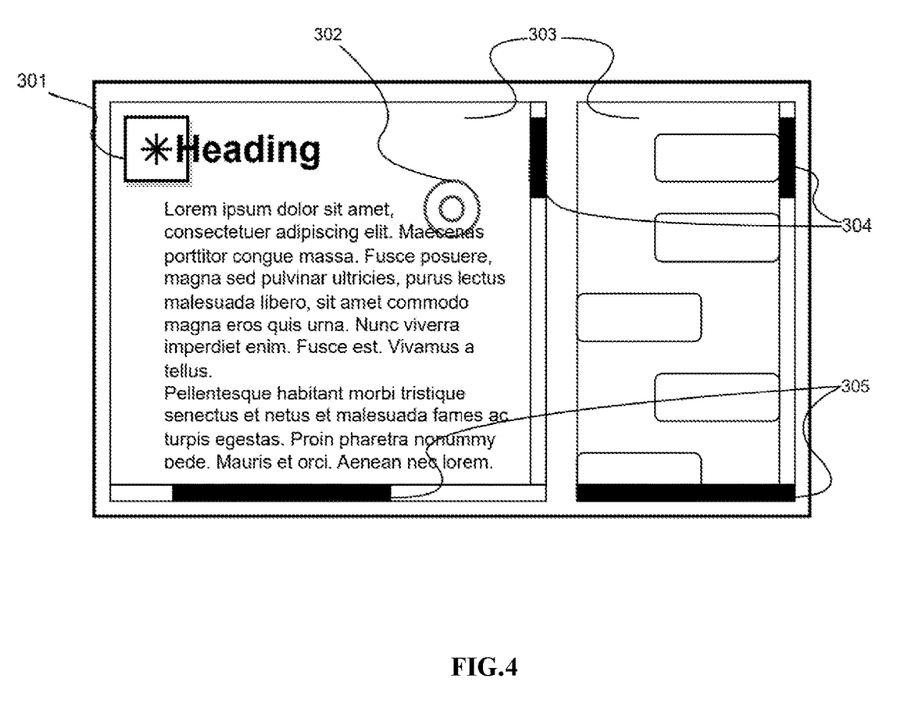
FIG. 4 is a screenshot illustrating an example of the user interface is displayed on the screen of the human-computer interface system.

FIG. 4 illustrates an example of the user interface displayed on the screen of the human-computer interface system, wherein the user interface displays user contents, and having function keys added aiming to facilitate the user when interacting by eye gaze.

The displayed contents are divided into two displaying areas on the screen in a form of two displaying frame 303, each displaying frame has both has a vertical scroll bar 304 and a horizontal scroll bar 305. Herein, the vertical scroll bars 304 and horizontal scroll bars 305 have the role of function keys already made available by the original application developer, and key 301 has the role of a function key added aiming to facilitate the user when interacting by eye gaze.

For several applications which are available from the original application developer, the user may perform scrolling up or scrolling down the user contents displayed in each of two displaying frames 303. For example, by using eye gaze to control the pointer moving to the down arrow position (not shown in the drawings) of the vertical scroll bar, when satisfying the inputting time duration for the key, the down arrow is selected and the user contents will be moved down a bit, the user may repeat this operation to scroll down the user contents to a position where the user expects to. However, this way is quite inconvenient, for example when the user expects to scroll down a relatively long paragraph(s) of the content. Therefore, the present invention provides additional function keys and an improved way of interaction aiming to facilitate the user when interacting by eye gaze.

Back to FIG. 4, the user uses eye gaze himself/herself to move the pointer 302 position to the key 301 position which is a function key, in particular, a selection interactive key to switch to a selection interactive mode (will be described later), to support the user able to interact better.

Herein, the pointer 302 is shown as two concentric circles, whose center is the current coordinates of the pointer. The inner circle has its radius proportion to the time duration in which the user keeps looking at a same pointer position on a certain key, when this time duration increasing the inner circle also getting smaller to indicate the possibility that the user expecting to select the key increasing.

It is obviously that, the user contents are displayed on the screen is without any limitation, such as said content may be corresponding contents in user applications, social networking applications, websites, electronic newspaper applications, email applications, list of applications, list of multimedia programs, for example.

In the drawings from FIG. 5a to FIG. 5f illustrate examples of interactive steps on the user interface of the interaction method using eye tracking data according to a preferred embodiment of the present invention.

Figure 5A:
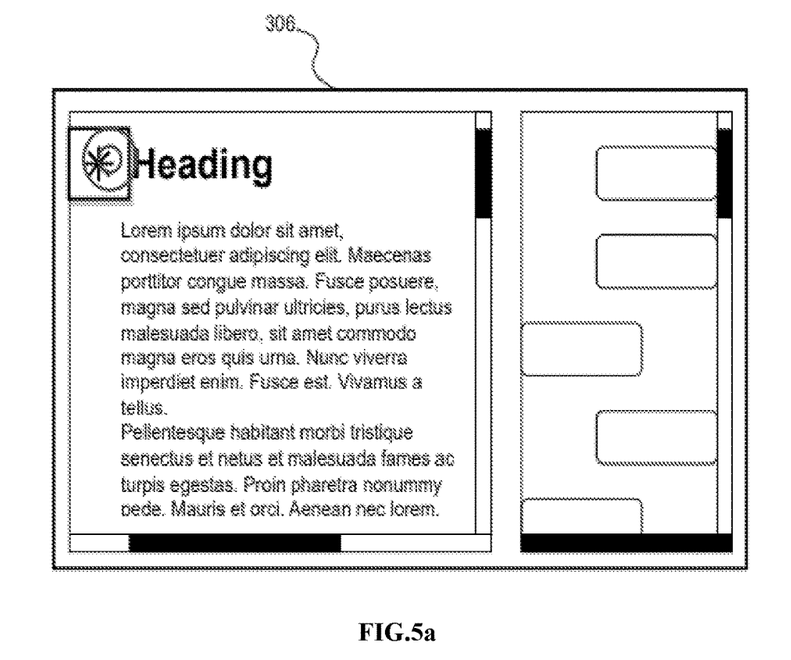
FIG. 5a to FIG. 5f are screenshots illustrating examples of interactions on the user interface of the interaction method using eye tracking data according to an preferred embodiment of the present invention.

FIG. 5a illustrates an example of the user interface 306 are displayed on the screen of the human-computer interface system, wherein the user interface 306 is displaying by default (or may be called as default mode), there is a function key added which is a selection interactive key, and there are user contents, for example an email application with a left frame displaying a content of an email and a right frame displaying a list of contacts.

Supposing that the user has finished drafting an email and completed inserting or adding receiver's address, therefore the left frame is displaying the upmost content of the email. As for the next, the user needs to select "Submit" button at the end position of the down scroll bar of the left frame (see FIG. 5c to FIG. 5f), the user may use eye gaze to control and move the pointer to the position of the selection interactive key and keep looking at that position long enough to satisfy the time constraint to select the selection interactive key.

Figure 5B:
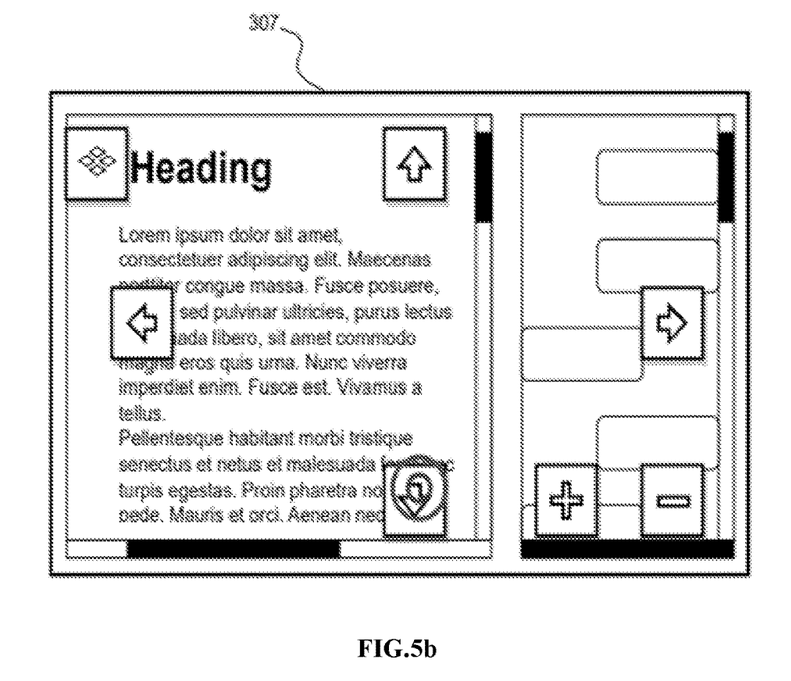

As shown in FIG. 5b, when the selection interactive key is selected, the application the application will switch to the interface 307 in the selection interactive mode and additional displaying function keys which are added including the selection keys of scroll up key, scroll down key, scroll left key, scroll right key, zoom in key, zoom out key, and a control interactive key.

To scroll down and select the "Submit" button, the user needs to use the eye gaze to control and move the pointer to the position of the scroll down key and keep looking at that position long enough to satisfy the time constraint to input said scroll down key.

Figure 5C:
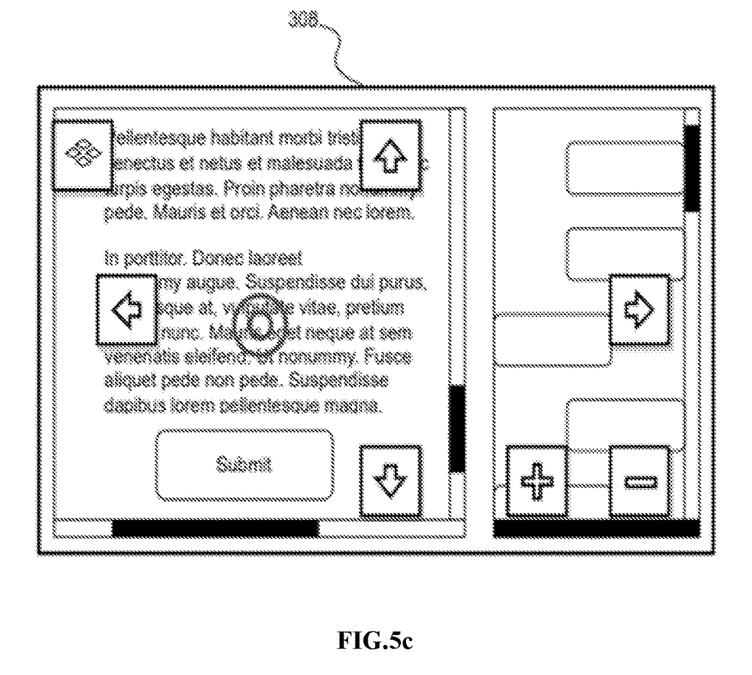

As shown in FIG. 5c, when the scroll down key is selected, the user needs to continue selecting which is the displaying content expected to scroll down, herein the content in the left frame will be scrolled down. The user looks at the area where there are the contents needs to be scrolled down, preferably in the center of this area, is the content in the left frame. When satisfying the time constraint to define that the user selects the content that is needed to scroll down being the content in the left frame, the content in the left frame will be automatically scrolled down by a predefined scroll down speed.

If it is not satisfied a scroll down finishing condition or a scroll down speed changing condition, the content in the left frame will be automatically scrolled down, it means that remaining to automatically change the user contents in the left frame in a predefined changing manner that is the scrolling down manner, and when up to the end part of the email and there is a "Submit" button as shown in the interface 308.

Figure 5D:
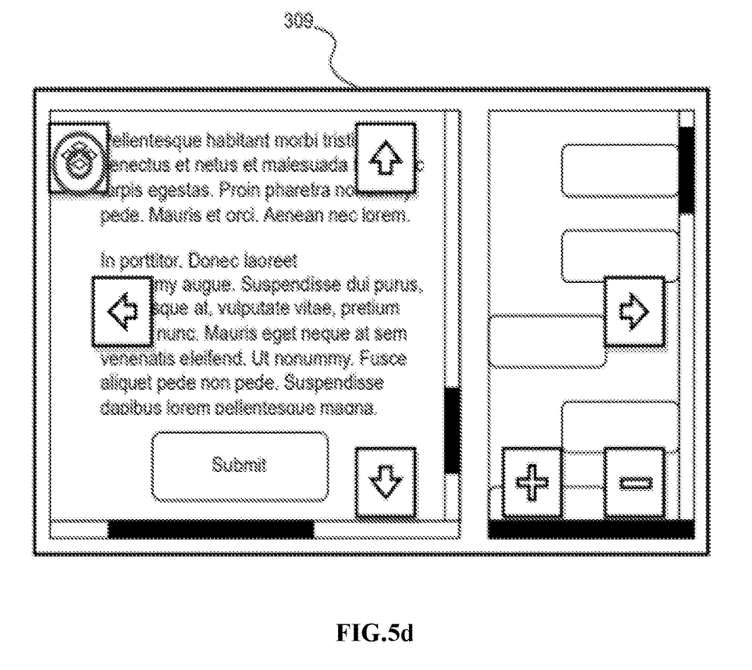

As shown in FIG. 5d, to finish the scrolling down and input the "Submit" button, the user needs to input the control interactive key before that as illustrated in the interface 309. The user needs to use the eye gaze to control and move the pointer to the position of the control interactive key and keeps looking at that position long enough to satisfy the time constraint to select the control interactive key.

Figure 5E:
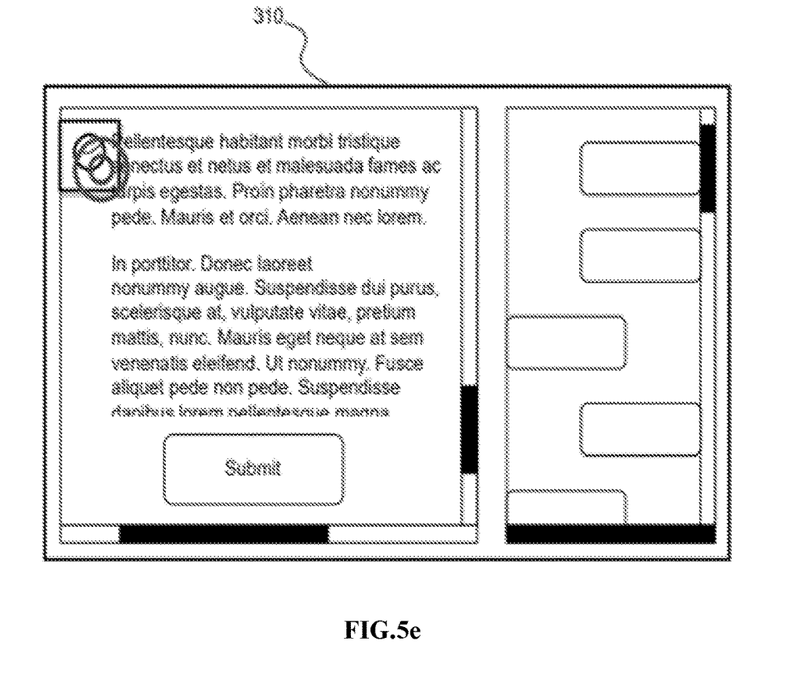

As shown in FIG. 5e, when the control interactive key is selected, the application will switch to the interface 310 in an idle interactive mode. The selection keys include the scroll up key, the scroll down key, scroll left key, scroll right key, zoom in key, zoom out key are no longer displayed. A function key is added which is an idle interactive key displayed in the idle interactive mode. To finish the idle interactive mode, the user needs to select the idle interactive key.

Figure 5F:
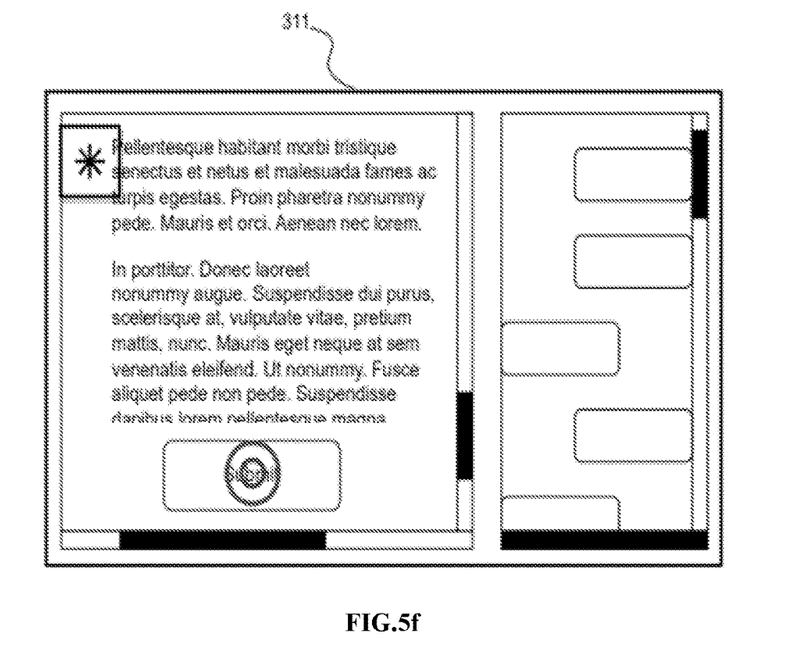

As shown in FIG. 5f, when the idle interactive key is selected, the application will switch to the interface 311 displaying as default, similar to the interface 306 but there is a difference that the content in the left frame has been scrolled to the position of the "Submit" button. At this moment, the user only needs to use the eye gaze to control and move the pointer to the position of the "Submit" button and keeps looking at that position long enough to satisfy the time constraint to select the "Submit" button to complete sending the email.

Herein, the "Submit" button is an example of keys which may be called as "execution keys" are displayed on the screen or already displayed on the screen to execute corresponding tasks once said execution key is inputted. The execution tasks may be different with each other depending on specific applications, such as a music playing task, stopping a video, speeding up a multimedia, selecting a content in a list, for example.

Similarly, the user may select the selection keys of scroll up key, scroll left key, scroll right key, zoom in key, zoom out key to perform automatically changing the user contents according to the expectation of the user.

Herein, the automatically changing the user contents in a predefined changing manner including scroll up, scroll down, scroll left, scroll right, zoom in, zoom out, corresponding to the selection keys including scroll up key, the scroll down key, scroll left key, scroll right key, zoom in key, zoom out key. However, the present invention is not limited thereto, the predefined changing manners may include other changing manners, for example turn the pages, move the pages, and insert new contents, and any similar changing manner. The user contents are not limited to any certain content, and may be corresponding contents in user applications, social networking applications, websites, electronic newspaper applications, email applications, list of applications, list of multimedia programs.

As described above, the interaction method using eye tracking data according to the present invention including modes that is the selection interactive mode, the control interactive mode, the idle interactive mode, and default displaying mode.

However, the present invention is not limited thereto, the interaction method using eye tracking data may be set including greater or fewer the above mentioned interactive modes, or changing the order to implement the interactive modes. Generating more or less function keys added for the purpose of making it easier for users to interact with their eyes may be applied. Moreover, displaying more than one function key added simultaneously on the screen may be applied to support the user able to interact in various different manner when stay on a same application interface.

As also described above, to display the selection keys, the user needs to input a selection interactive key by the eyes of the user to generate a control command or a control signal may be called as a "selecting interaction control signal" to control the human-computer interface system to switch to a selection interactive mode.

However, the present invention is not limited thereto, the selecting interaction control signal of the user may be generated by any manner as long as it is suitable for reflecting that the user intends to automatically change the user contents being displayed on the screen, for example by eye movement gestures (such as flashing continuously a certain number of times), or even by an opening action of the user on the application, by this way, it may be understood that the selection keys are displayed right after the user enter into the application, for example.

According to the method described above, to finish automatically changing the user contents in a predefined changing manner (for example, automatically changing the displaying area of the email by scrolling down), the user needs to input a control interactive key. This may be easy for application development, however it may be a bit inconvenient for users, for example when scrolling down to the position where the user expects already but the user has not selected yet the control interactive key to stop.

According to an alternative embodiment, the interaction method using eye tracking data may further comprising analyzing at least eye movements of the user to determine whether to continue automatically changing the user contents in a predefined changing manner or not.

For example, said eye movement analyzing of the user comprising at least analyzing the correlation between the speed and eye movement direction with the change of the user contents. Supposing that the user reads a book or story online, and selects the scroll down key to automatically scroll down the content, when the scrolling down speed is too slow in comparison to the reading speed then the user's eyes may look at the lower part of the screen, in vice versa when the scrolling down speed is too fast in comparison to the reading speed then the user's eyes may look at the upper part of the screen, for example.

According to a preferred embodiment, said automatically changing the user contents in a predefined changing manner may be stopped or temporarily stopped during a predetermined time duration when moving to the position where there are the execution keys.

As an example, when the possibility for the user to select the execution keys is high (for example, there is only one execution key that is the "Submit" button then, when scrolling down to the "Submit" button, the program may be stopped.

As another example, when there are more than one execution keys arranged, such as at different paragraphs of positions to insert content, then automatically changing the user contents may be temporarily stopped during a predetermined time duration when moving to the position where there are the execution keys, to support the user to have a certain time duration to decide interacting with said execution keys.

According to a preferred embodiment, said automatically changing the user contents may have a changing speed selected among of predefined changing speeds arranged in levels from slow to fast. The level of the changing speed will be determined based on at least the number of consecutive times that the selection key is inputted, the previous level of the changing speed, and the previous changing mode.

As for a convenience, the adjustment of changing speeds as for the same predefined changing manner may be commonly used on selection key. For example, for the predefined changing manner that is scrolling down, then the same scroll down key may be used to adjust several levels of different changing speeds. For example, considering four levels of the changing speeds varying from slow to fast zero, 1 v, 2 v, 3 v, corresponding to the scrolling down speeds from slow to fast. At the beginning, the scroll down is not occurred, the user select the scroll down key, the scrolling down content will be automatically scrolled down with the speed of 1 v; next, the user continue to select the scroll down key again the scrolling down speed will be changed from 1 v into 2 v; the user select the scroll down key again then the scrolling down speed will be changed from 2 v into 3 v; if the user continues to select the scroll down key once again then the scrolling down speed will be changed from 3 v into 1 v, for example.

Figure 6A:
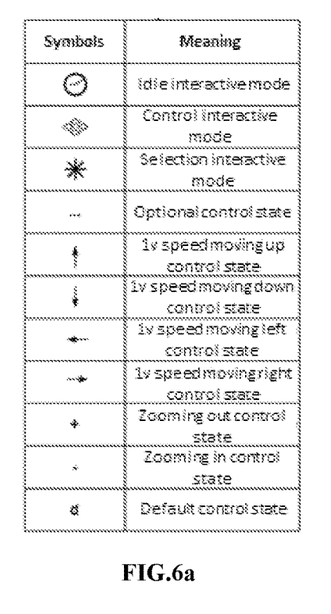
FIG. 6a is a table illustrating an example of a list of symbols indicating modes or control states.
Figure 6B:
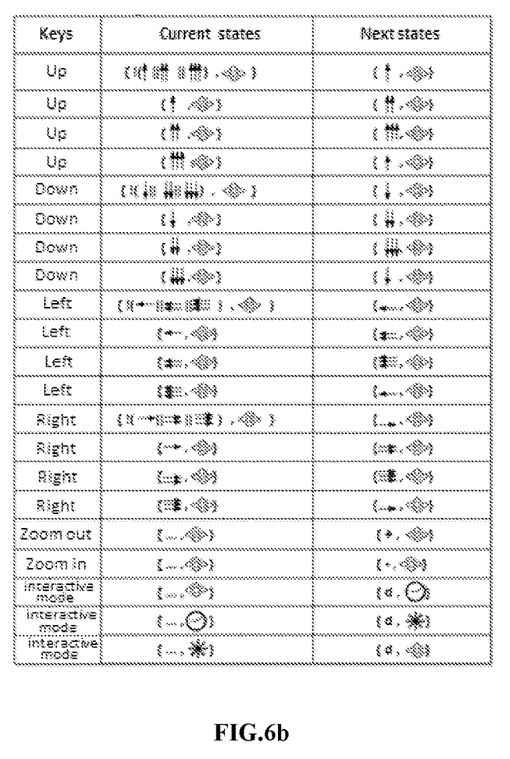
FIG. 6b is a table illustrating an example of a list of keys in the relationship between the current interaction state and the next interaction state.

FIG. 6a is a table shows an example of a list of symbols indicating modes or control status and FIG. 6b is a table shows an example of a list of keys in the relationship between the current interaction state and the next interaction state (for example, after selecting a key). Herein, interactive state may include two elements which are control states (for example, the level of the changing speed and the changing manner) and interactive modes (for example, the selection interactive mode, the control interactive mode, the idle interactive mode, or the default mode). Said two elements are indicated as below:

$$s=\{\text{control state,interactive mode}\}.$$

When the user selects a certain key, that selected key and the current state will be defined, to switch to the next state, for example as shown in the table of FIG. 6b.

According to another aspect, the present invention provides a non-transitory computer readable storage medium storing a computer readable program comprising instructions that, when executed will cause the computer implementing above mentioned method.

According to an embodiment, the above mentioned algorithms may be implemented by computing devices, such as a computer, which include a processor and a storage. The term "processor" must be interpreted in a broad sense including a general-purpose processor, a central processing unit (CPU), a microprocessor, a digital signal processor (DSP), a controller, a microcontroller, a state machine, and similar processors. In some cases, a "processor" may be used to refer to an application-specific integrated circuit (ASIC), a programmable logic device (PLD), a field programmable gate array (FPGA), and similar devices. The term "processor" may be used to refer the combination form of processors, for example, the combination form of a DSP and a processor, the combination form of the plurality of processor, the combination form of one or more processors combined with a DSP core, or the combination form of different configurations. The term "storage" must be interpreted in a broad sense including any electronic component capable of storing electronic information. The term "storage" may be used to refer different types of media readable by a processor, such as a random access memory (RAM), a read-only memory (ROM), a non-volatile random access memory (NVRAM), a programmable read-only memory (PROM), an erase-programmable read-only memory (EPROM), an electrically erasable programmable read-only memory (EEPROM), a flash memory, a magnetic or an optical data storage device, register, and similar memories. When the processor is capable of reading information from and/or writing information to memory, then the memory can be said to be communicating electronically with the processor. The memory embedded into the processor is in a state of electronically communication with the processor.

The above described embodiments of the present invention may be recorded as a program capable of being implemented by a computer and by a general purpose digital computer which operates this program through a computer readable storage medium. The computer readable storage medium may include a storage medium such as a magnetic storage medium (for example, ROM, a floppy disk, a hard disk, etc.) and an optical storage medium (for example, CD-ROM, DVD, etc.).

Various embodiments have been described above. It will be apparent to those of ordinary skill in the art that the present invention may be implemented in various different forms without departing from the spirit and scope of the invention. Therefore, the above embodiments of the present invention must be considered in a descriptive sense and not for the purpose of limiting the invention. The scope of the present invention is defined as the appended claims rather than in the above mentioned description, and all distinct parts falling within equivalence shall be construed to remain within the scope of the invention.

What is claimed is:

1. An interaction method using eye tracking data, used in human-computer interface system with at least a screen configured to display at least user contents and an eye tracking device to collect eye tracking (ET) data, the method comprising following steps:
displaying selection keys on the screen, when there is a selecting interaction control signal of the user reflecting that the user intends to automatically change the user contents being displayed on the screen;
collecting and processing an ET dataset while the user is looking at the screen to determine the eye tracking data which is the data of coordinate form (x, y) corresponding to the position on the screen that the user's eyes look at;
defining a selection key which the user wants to input based on at least the eye tracking data when the user inputs the selection key by eye gaze;
automatically changing the user contents in a predefined changing manner corresponding to the selection key inputted by the eye gaze of the user,
wherein said predefined changing manner selected from a group including at least scroll down, scroll up, scroll right, scroll left, zoom in, zoom out, turn the pages, move the pages, and insert new contents;

wherein:
the user contents, which are automatically changed in a predefined changing manner, is user contents within at least a displaying area on the screen,
wherein said displaying area on the screen is defined based on at least the eye tracking data when the user selects said displaying area on the screen by looking at the displaying area on the screen after the user has completed said selection key inputting; and
the selecting interaction control signal of the user generated when the user inputs an selection interactive key by the eye gaze of the user, and switch to an selection interactive mode, in the selection interactive mode the selection keys are displayed on the screen while the screen keeps showing the previous contents or information,
wherein the screen further displays at least one control interactive key in the selection interactive mode together with the selection keys,
wherein said automatically changing the user contents in said predefined changing manner is stopped when the control interactive key is inputted, and switched to an idle interactive mode.

2. The method according to claim 1, wherein the screen further displays at least one idle interactive key in the idle interactive mode,
wherein, if the control interactive key is inputted then the user is allowed to select execution keys displayed on the screen or already displayed on the screen to execute a task corresponding to the execution key inputted.

3. The method according to claim 2, wherein said displaying area on the screen is a displaying frame on the screen having both a vertical scrollbar and a horizontal scrollbar,
wherein the displaying frame on the screen has at least one execution key at the end of the vertical or horizontal scrolling movement path.

4. The method according to claim 1, wherein the method further comprising analyzing at least eye movements of the user to determine whether to continue automatically changing the user contents in a predefined changing manner or not.

5. The method according to claim 4, wherein said eye movement analyzing of the user comprising at least analyzing the correlation between the speed and the eye movement direction with the change of user contents.

6. The method according to claim 1, wherein said automatically changing the user contents has a changing speed selected among of predefined changing speeds arranged in levels from slow to fast.

7. The method according to claim 6, wherein the level of the changing speed will be determined based on at least the number of consecutive times that a selection key is inputted, a previous level of the changing speed, and a previous changing mode.

8. The method according to claim 6, wherein the method further comprising analyzing at least eye movements of the user to adjust the current changing speed of said automatically changing the user contents.

9. The method according to claim 1, wherein said defining a selection key which the user wants to input based on eye tracking data comprising:
defining a selection key which the user wants to input based on the (x, y) coordinates on the screen that the user's eyes be looking at by calculating whether said (x, y) coordinates is within the boundary of a certain key or not, if the (x, y) coordinates is within the boundary of the key then setting up and calculating a time counting parameter t to confirm whether the user is trying to select said key or not, based on at least a time constraint defined as t≥dwell, wherein dwell is a known parameter corresponding to a required time duration that the user has to look at a key to select that key, and when the time constraint is satisfied then confirming that the user wants to select that key.

10. The method according to claim 9, wherein the time counting parameter t is defined by an actual time that the user keeps looking at said selection key.

11. The method according to claim 9, wherein the time counting parameter t is defined according to the formula $t:=t+\Delta+\Delta_T$ in each cycle and repeated in the next cycle, wherein:

$\Delta>0$ is an increasing rate of the time counting parameter; and $\Delta_T$ is an adjusting rate is defined based on Electroencephalography (EEG) data, wherein $\Delta_T>0$ reflecting concentration status of the user and $\Delta_T<0$ reflecting non-concentration status of the user, while the user is looking at the selection key.

12. The method according to claim 1, wherein the eye tracking device is a fixed device embedded in the screen, a device connected or attached on the screen of an electronic apparatus, or a device which is wearable by the user preferred as a glasses.

13. A non-transitory computer readable storage medium stores a computer readable program comprising instructions that, when executed will cause the computer implementing the method according to claim 1.

* * * * *